US009264662B2

(12) United States Patent
Shapiro

(10) Patent No.: US 9,264,662 B2
(45) Date of Patent: Feb. 16, 2016

(54) CHAT PREAUTHORIZATION

(71) Applicant: OnCam, Inc., Beverly Hills, CA (US)

(72) Inventor: Joseph Shapiro, Paradise Valley, AZ (US)

(73) Assignee: OnCam Inc., Beverly Hills, CA (US)

(*) Notice: Subject to any disclaimer, the term of this patent is extended or adjusted under 35 U.S.C. 154(b) by 87 days.

(21) Appl. No.: 14/144,068

(22) Filed: Dec. 30, 2013

(65) Prior Publication Data
US 2015/0189230 A1 Jul. 2, 2015

(51) Int. Cl.
H04N 7/14 (2006.01)
H04L 12/927 (2013.01)

(52) U.S. Cl.
CPC .............. *H04N 7/147* (2013.01); *H04L 47/808* (2013.01)

(58) Field of Classification Search
CPC ........... H04N 7/14; H04N 7/15; H04N 7/152; H04N 7/141
USPC .............. 348/14.01–14.12; 715/753; 709/204
See application file for complete search history.

(56) References Cited

U.S. PATENT DOCUMENTS

| | | | |
|---|---|---|---|
| 7,904,537 B2 | 3/2011 | Lim et al. | |
| 8,482,593 B2 | 7/2013 | Periyannan et al. | |
| 8,514,263 B2 | 8/2013 | Periyannan et al. | |
| 8,529,356 B2 | 9/2013 | Soelberg et al. | |
| 2007/0285501 A1* | 12/2007 | Yim | 348/14.08 |
| 2009/0222572 A1 | 9/2009 | Fujihara | |
| 2010/0234002 A1 | 9/2010 | Scheffer et al. | |
| 2011/0313941 A1* | 12/2011 | Rahman | 705/321 |
| 2012/0082226 A1 | 4/2012 | Weber | |
| 2012/0236796 A1* | 9/2012 | Lazaridis et al. | 370/328 |
| 2013/0123019 A1 | 5/2013 | Sullivan et al. | |
| 2013/0147906 A1 | 6/2013 | Weiser et al. | |
| 2013/0165171 A1* | 6/2013 | Pai et al. | 455/518 |

OTHER PUBLICATIONS

UBM LLC, Cloud-Based Video Conferencing: a Flexible Approach to Face-to-Face Communication, Technology Brief, Mar. 2013, total of 5 pages.

* cited by examiner

*Primary Examiner* — Melur Ramakrishnaiah
(74) *Attorney, Agent, or Firm* — SoCal IP Law Group LLP; Jonathan Pearce; Steven C. Sereboff

(57) ABSTRACT

There is disclosed a system and a method of initiating a one-click video chat session. The method includes accessing a database to determine whether the target chat participant has pre-authorized the source chat participant to initiate a chat without requiring acceptance of the chat request, a source chat participant sending a chat request requesting a chat session with a target chat participant while a computing device associated with the target chat participant is not generating any audio component nor any video component, and causing the computing device associated with the target chat participant to begin providing at least one of an audio component and a video component to the source chat participant without any action on the part of the target chat participant.

14 Claims, 11 Drawing Sheets

CHAT PREAUTHORIZATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent is related to U.S. patent application Ser. No. 14/140,839 filed Dec. 26, 2013 and entitled "REAL TIME STREAM PROVISIONING INFRASTRUCTURE" and the U.S. patent application Ser. No. 14/143,945 filed Dec. 30, 2013 and entitled "PRIVATE-PUBLIC CHAT FUNCTIONALITY."

BACKGROUND

1. Field

This disclosure relates to chat preauthorization for use in audio-visual multi-user chat interactions.

2. Description of the Related Art

Audio-visual chat has been available among a plurality of computer users for some time. For example, Skype® enables audio-visual user-to-user calling via a peer-to-peer system with server-based initiation and messaging protocols. More recently, Skype®, Facetime®, and Google® Hangouts have enabled various permutations of so-called "group" audio-visual chat sessions. Facetime® and Skype® also enable mobile-to-mobile single-user-to-single-user audio-visual calling.

In a related field, websites such as YouTube®, Netflix® and Vimeo® have enabled streaming of stored videos. Sites such as UStream® and Twit.tv® have enabled real time or "live" (or nearly-live) audio-visual streaming. Stored video streaming has relied upon conversion of the video into a format suitable for low-bandwidth streaming. In some cases, such as with Netflix®, algorithms can dynamically alter the quality of the stream in real-time so as to accommodate higher or lower bandwidth availability. Real time audio-visual streaming typically relies upon a single stream and, encodes the stream before it is broadcast directly from the stream to any number of watchers using multicast protocols. Some of these real time streaming services can operate directly from mobile devices, but offer limited streaming capabilities, low resolution, and delay the stream in order to account for issues related to mobile device processing capability, latency and bandwidth considerations.

With the increase in usage of audio-visual chats, there is a need for allowing users to connect with each other without having to request a call. Typical solutions rely upon an offer-and-acceptance model. That is, users now wish to talk or view their friends instantly and waiting for a user to answer a call delays the ability to instantly talk to one of their contacts. Therefore, a solution is required to allow users to instantly talk or view their contacts, without first waiting for the user on the other end to answer the phone call.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
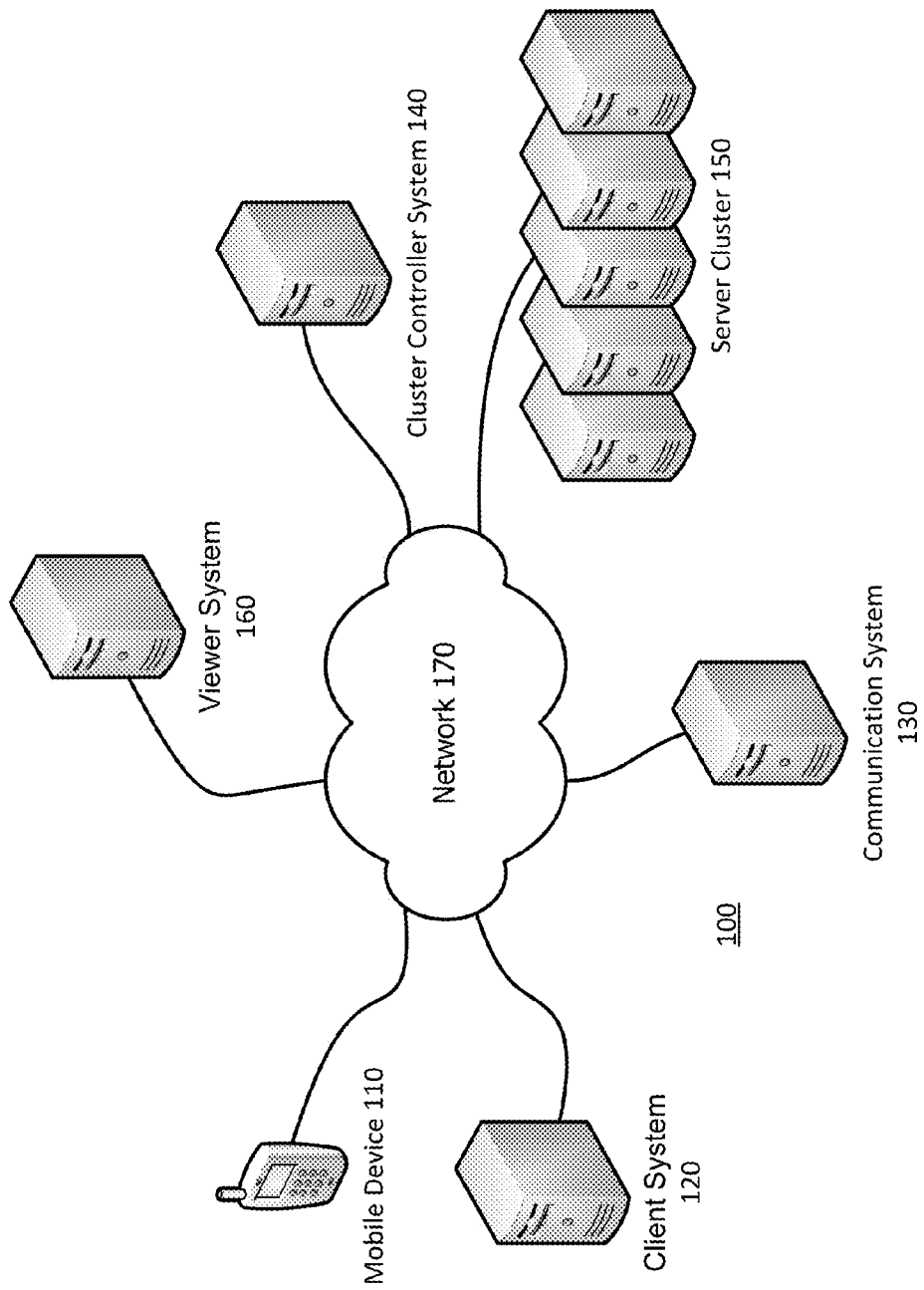
FIG. 1 is a block diagram of a real time stream provisioning infrastructure.

Referring now to FIG. 1, there is shown a block diagram of an environment for search and ranking of procedures to complete a task. The environment 100 includes a mobile device 110, a client system 120, a communication system 130, a cluster controller system 140, a server cluster 150, and a viewer system 160. Each of these elements are interconnected via a network 170.

The mobile device 110 and client system 120 are computing devices (see FIG. 1) that are used by chat participants and viewers in order to take part in or to view a chat. The mobile device 110 may be a mobile phone including a screen, a microphone and a video camera. The client system 120 may be a personal desktop computer, a tablet, a laptop or a similar device including a screen, a microphone and a video camera. The screen, microphone and video camera may be independent of or integral to either the mobile device 110 or the client system 120.

For purposes of this patent, the term "chat" means an audio and/or video simultaneous communication involving at least two chat participants. A "chat participant" is an individual taking part in a chat, using a mobile device 110 or a client system 120, and providing an audio and/or video component making up a part of the chat. A "chat viewer," in contrast, is an individual viewing a chat, but not providing any audio and/or video component making up a part of the chat. In some situations, a "chat viewer" may, permanently or temporarily, be converted into a chat participant, either of their own volition, if allowed by the system, by an administrator of a chat, or by another chat participant. A "source chat participant" is a chat participant who initiates a one-click audio-visual chat session in order to unilaterally initiate a chat with another chat participant. When the "source chat participant" requests unilaterally to initiate a chat with another chat participant, the source chat participant's audio or video component has not yet begun streaming. A "target chat participant" is a chat participant who pre-authorizes a source chat participant to unilaterally initiate a chat with the target chat participant. If a "target chat participant" has pre-authorized the source chat participant to unilaterally initiate a chat with the target chat participant, then the target chat participant's audio and/or video component will begin streaming immediately in response to the source chat participant's request.

An "audio component," a "video component" or an "audio-visual component" as used herein means an audio and/or video stream provided by a single chat participant. A "combined" audio and video stream or audio-visual stream is an audio and/or video stream simultaneously incorporating the components of more than one chat participant in a single stream. A "master" audio stream, video stream, or audio-visual stream is an audio and/or video stream simultaneously incorporating the components of all chat participants.

A "contact" is someone who is stored in a chat participant's listing of other potential chat participants. Each chat participant of the system may create a list of contacts. These contacts may already use the system, or they can be invited to use the system. The contact's information is stored in a database associated with the chat participant's account. The information stored includes the contact name and the contact's username, which is required to locate the contact on the system to initiate a chat between the target chat participant and the source chat participant.

A "drop-in" chat session, as used herein, is a pre-authorized unilateral chat session initiated by a source chat participant with a target chat participant. When a source chat participant drops-in on a target chat participant, no acceptance on the part of the target chat participant is required before an audio component and/or video component generated by the target chat participant begins being transferred to the source chat participant.

The term "automatic" as used herein means completed by a computing device without human intervention.

The communication system 130 is a computing device that is responsible for routing communications, such as chat initiation requests, any text-based communication between chat participants and viewers, any unique chat identifiers, and the protocol communications necessary to establish, initiate, maintain, and end chat sessions. The communication system 130 may enable peer-to-peer sessions to be initiated. The communication system 130 may be made up of more than one physical or logical computing device in one or more locations.

The cluster controller system 140 is a computing device that is responsible for receiving chat initiation (and termination) requests and then identifying and allocating a server, from the server cluster 150, to handle audio-visual chats. The cluster controller system 140 may also maintain a full database of all ongoing chats and each participant in the ongoing chats. The cluster controller system 140 may operate as an organizer of the overall audio-visual chat process. In situations in which a server, from the server cluster 150, ceases to function or is no longer reachable on the network, the cluster controller system 140 may transition an in-process audio-visual chat to a newly-provisioned server within the server cluster 150.

The server cluster 150 is a group of servers that are available to be used to host one or more audio-visual chats. A server within the server cluster 150 is used to receive a plurality of audio and/or video components from a plurality of chat participants and to encode those into one or more combined audio and/or video streams. The server cluster 150 may, for example, be a set of dynamically available servers that may be allocated on an as-needed basis for use in one or more audio-visual chats. Amazon® and Microsoft® currently offer such servers that may be paid-for on an as-needed basis. As discussed more fully below, the servers making up the server cluster 150 each incorporate at least one graphical processing unit (GPU) for use in encoding audio and/or video.

The viewer system 160 is a computing device that is used to view an on-going audio-visual chat. The viewer system 160 is essentially the same as the mobile device 110 and the client system 120, but is used by a chat viewer. As a result, the viewer system 160 does not provide an audio and/or video component for inclusion in the chat. Instead, the viewer system 160 merely receives an audio and/or video stream.

Figure 2:
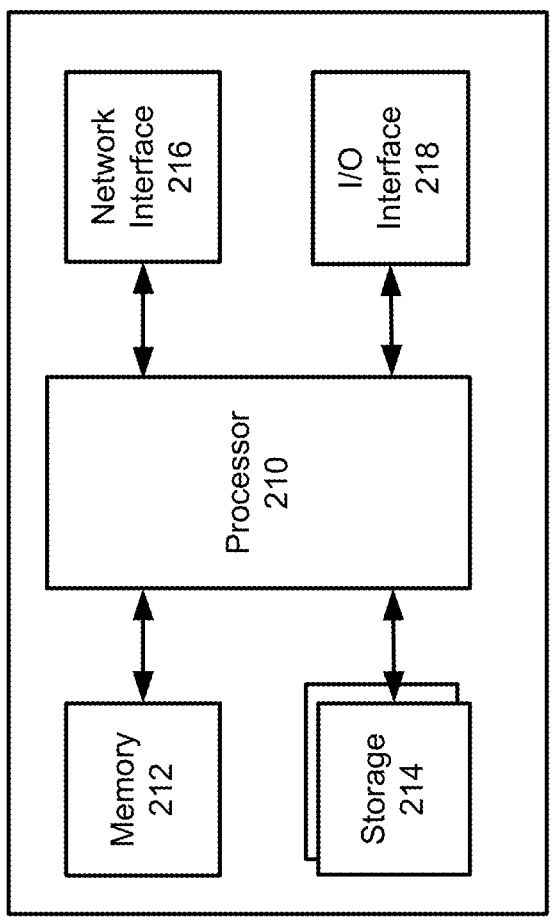
FIG. 2 is a block diagram of a computing device.

Turning now to FIG. 2 there is shown a block diagram of a computing device 200, which is representative of the mobile device 110, the client system 120, the communication system 130, the cluster controller system 140, and the viewer system 160 in FIG. 1. The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210.

The storage 214 provides non-volatile, bulk or long term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 214 and does not include transitory media such as signals or waveforms. In some cases, such as those involving solid state memory devices, the memory 212 and storage 214 may be a single device.

The network interface 216 includes an interface to a network such as network 170 (FIG. 1). The network interface 216 may be wired or wireless.

The I/O interface 218 interfaces the processor 210 to peripherals (not shown) such as displays, video cameras, microphones, keyboards and USB devices.

Figure 3:
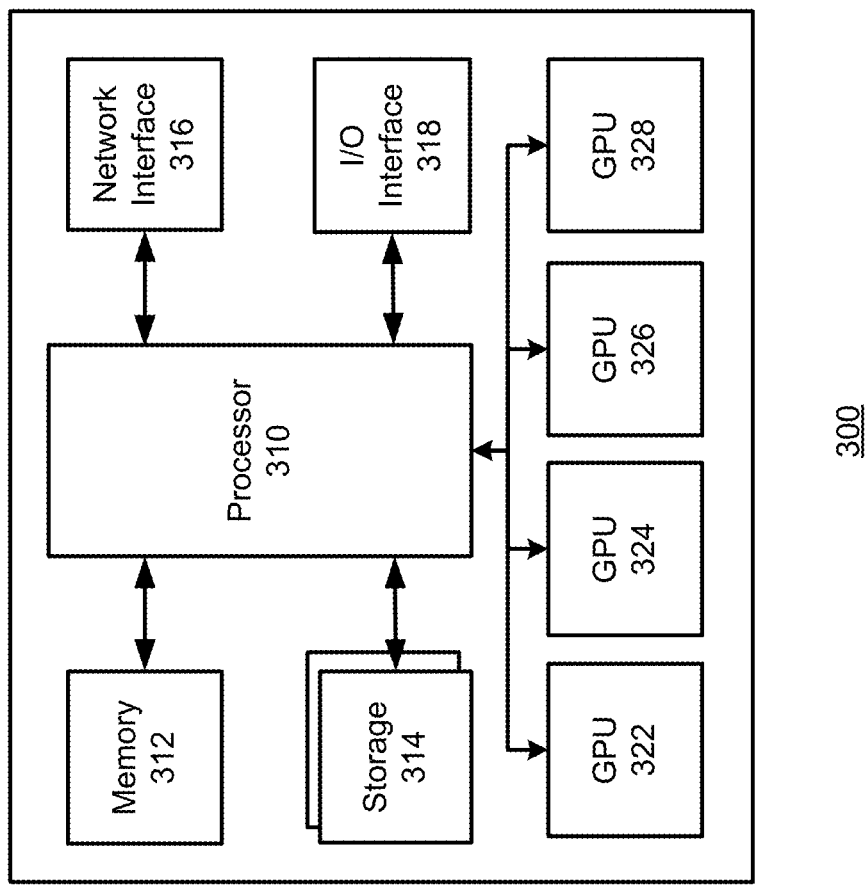
FIG. 3 is a block diagram of an encoding computing device.

Turning now to FIG. 3 there is shown a block diagram of an encoding computing device 300, which is representative of the servers making up the server cluster 150 in FIG. 1. The processor 310, memory 312, storage 314, network interface 316 and I/O interface 318 of FIG. 3 serve the same function as the corresponding elements discussed with reference to FIG. 2 above. These will not be discussed further here.

The GPUs (graphical processing units) 322, 324, 326, and 328 are also present in this computing device 300. There may be more or fewer GPUs dependent upon the needs of the computing device 300. GPUs, such as GPU 322, are specialized processors including instruction sets designed specifically for processing visual-related algorithms. GPUs differ from CPUs (such as processor 310) primarily in that they are capable of interacting with memory directly allocated to the GPU very rapidly and, as a result, can manipulate the large quantities of data pertaining to computer visual functions stored in that memory very rapidly. In addition, GPUs typically incorporate a "frame buffer" which stores processed data in a format suitable for near-direct output to a computer display. Finally, GPUs, unlike most CPUs, offer high parallelism that enables them to process large blocks of data simultaneously.

In addition, multiple GPUs may be incorporated into a single computing device 300 to enable simultaneous processing by multiple GPUs. The computing device 300 may include, for example, five GPUs, each operating independently from one another and communicating with a single CPU (such as processor 310). As used herein a GPU is distinct from and in addition to a CPU. A GPU, as used herein, incorporates at least one specific instruction set for operating upon computer graphical data. The instruction set specific to the GPU and is not incorporated in the CPU.

Figure 4:
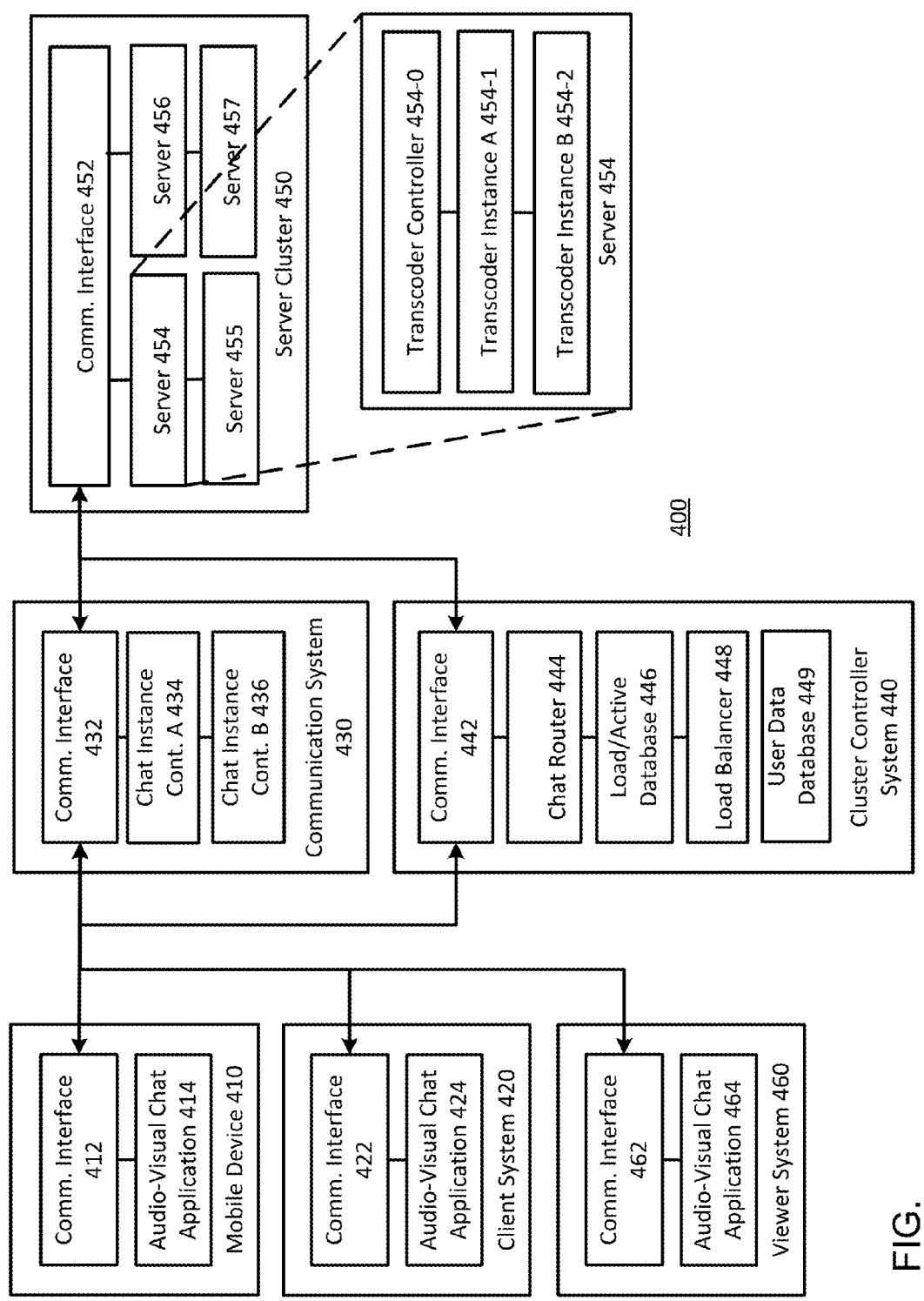
FIG. 4 is a functional diagram of a real time stream provisioning infrastructure.

Turning now to FIG. 4, a functional diagram of a real time stream provisioning infrastructure 400 is shown. FIG. 4 corresponds to FIG. 1, but includes more detail regarding the functional elements making up the individual computing devices. As such, the mobile device 410, the client system 420, the communication system 430, the cluster controller system 440, the server cluster 450 and the viewer system 460 each have counterparts in FIG. 1.

The mobile device 410 and client system 420, each include a communication interface 412, 422 and an audio-visual chat application 414, 424. The communication interface 412, 422 are used to enable textual chat between chat participants. The textual chat may take the form of an asynchronous communication between the chat participants and may include text, images (such as .jpg, .gif) and embedded videos (such as from YouTube® and similar video sharing sites).

The communication interface 412, 422 is also used to transfer signaling and protocol related messages pertaining to the creation, maintenance and ending of chats between the mobile device 410, the client system 420, any viewer systems 460 and the cluster controller system 440 and the server cluster 450. These messages signal to the communication system 430 which then signals messages to cluster controller system 440, the server cluster 450 and to the mobile devices and client systems associated with chat participants that at least one chat participant wishes to initiate, continue, and/or end a chat. In addition, messages identifying the chat participants and any viewers and, potentially, identifying the types of computing devices used for those chats, the connection, the status of whether those chat participants or viewers remain and numerous other types of information that may be relevant to the cluster controller system 440, the server cluster 450, using the communication system 430, and communication interface 412, 422.

The audio-visual chat application 414, 424 operate to receive audio and/or video components provided by a chat participant using either a mobile device 410 or a client system 420 and to cause those components to be transmitted to (or through) a cluster controller system 440 for combination into one or more combined streams. The audio-visual chat application 414, 424 may then receive the one or more combined streams and display those to a chat participant using the mobile device 410 or the client system 420.

The communication system 430 uses a communication interface 432 to communicate chat requests, initiation messages, chat end messages, and related protocol messages to and from chat participants and any of the infrastructure 400 elements. The communication system 430 may provide, for example, a uniform resource locator (URL) for a particular chat session or a particular chat participant. This URL may redirect requests to an associated real-time audio and/or video stream.

The communication system 430 also includes chat instance controllers, such as chat instance controller A 434 and chat instance controller B 436, for each concurrent chat operating on the system. These controllers 434 and 436 operate as central hubs for all protocol, text, audio components and video components making up a part of a particular chat. A chat may be identified by a particular chat ID, with protocol messages, text, audio components and video components directed to the communication system using the chat ID to determine which chat instance controller the data is directed.

One example of a communication system like the communication system 430 is a system currently provided by Wowza® which enables publication of audio and video components by individual users and further enables publication of a resulting combined or master stream to a plurality of chat participants and chat viewers. Wowza®, among other things, incorporates a protocol for initiating the broadcast (or transmission) of those streams and for receipt of the combined stream for broadcasting to an identified group of chat participants and chat viewers. These protocols are an example of the communication protocols used by the communication interface 412, 422, although many other systems offering similar functionality may be used. Additional or different systems may make up all or a part of the communication system 430 which may also enable text chat, routing of protocol messages, sharing of audio/visual data via social networks, social network API integration, instant messaging and other, similar functions.

The cluster controller system 440 is primarily responsible for acting as an orchestrator and a conduit for audio component and video component encoding operations that are passed to the server cluster 450. The cluster controller system 440 incorporates a communication interface 432, a chat router 444, a load/active database 446 and a load balancer 448. The communication interface 442 operates, in conjunction with the communication system 430, to receive and route chat requests, maintenance messages and chat termination messages.

The chat router 444 operates to direct incoming audio and/or video components from one or more chat participants to a server within the server cluster (or to a newly-allocated server) for encoding of the audio and/or video components into one or more combined streams. The load/active database 446 maintains a database of all on-going chats and all participants and viewers for each of those chats. This enables the cluster controller system 440 to determine which audio and/or video components and which combined and master streams pertain to which chats and/or chat participants and chat viewers.

In addition, the load/active database 446 maintains a database of the overall load associated with the encoding operations of each server making up the server cluster 450. This enables the cluster controller system 440 to determine which server, of the server cluster 450, would be best-suited to service a new chat and when to activate additional servers available to the server cluster 150 in order to avoid overextending one or more server's capacity to host chats.

Similarly, the load balancer 448 uses the information in the load/active database to activate new servers, deactivate unused (or underused) servers, to transfer ongoing chats in real-time to less-utilized servers and to otherwise ensure that an efficient use of the server cluster 450 is taking place. In the event of a server failure, the load balancer 448 may use the information in the load/active database 446 to quickly transition all ongoing chats to one or more other servers.

The user data database 449 maintains a database of user information. For example, the user data database 449 includes a database for each chat participant, and for each chat participant, the database may include information relating to the chat participant's settings, chat participant's events, and chat participant's contacts. In addition, the database may include a list of source chat participants that a target chat participant pre-authorizes to initiate a one-click audio-visual chat session with the target chat participant. Specifically, the database may store a list of the source chat participants who have been authorized to drop-in on a target chat participant. Each source chat participant who has been authorized to initiate a one-click audio-visual chat with a target chat participant, may be assigned a source chat participant identifier, which will be stored in the database along with the source chat participant's information. When the source chat participant initiates a one-click audio-visual chat with potential target chat participant, the source chat participant identifier may be used to verify that the source chat participant has been pre-authorized to initiate a one-click audio-visual chat. If the target chat participant has not pre-authorized the source chat participant, then the source chat participant identifier will not be stored in the associated database for the target chat participant. The source chat participant then will not be able to initiate a one-click audio-visual chat. If the target chat participant has pre-authorized the source chat participant, the source chat participant identifier will be stored in the associated database for the target chat participant and the source chat participant will be able to initiate a one-click chat.

The server cluster 450 is a group of servers 454, 455, 456, 457 and an associated communication interface 452 that are responsible for encoding multiple audio and/or video components into one or more combined or master streams.

Each server in the server cluster 450, such as server 454, can include a transcoder controller 454-0 that is responsible for directing transcoding of audio and/or video components and other messages to one of a plurality of transcoder instances 454-1, 454-2 operating on that server 454. The transcoder controller 454-0 may also report back usages and load data to the load/active database 446 for use by the load balancer 448. Incoming audio and/or video components may only be identified by a chat ID, and the transcoder controller 454-0 may use that to direct the stream to the appropriate transcoder instance.

The transcoder instances A 454-1 and B 454-2 are responsible for directing one or more GPUs on the server 454 to transcode audio and/or video components into a series of combined audio and/or video streams for service back to one or more of the chat participants.

The viewer system 460 operates in virtually the same fashion as the mobile device 410 and the client system 420. However, the audio-visual chat application 464 of a chat viewer using the viewer system 460 does not provide an audio and/or video component for combination into a combined or master stream.

As indicated above, the chat viewer using the viewer system 460 may, temporarily or permanently, become a chat participant. In such a case, the communication interface 462 communicates a desire to become a chat participant in an ongoing chat or in a new chat, the communication system 430 provisions that chat in interaction with the cluster controller system 440 and adds the chat viewer (now participant) to a chat instance on a server available to the server cluster 450.

Figure 5:
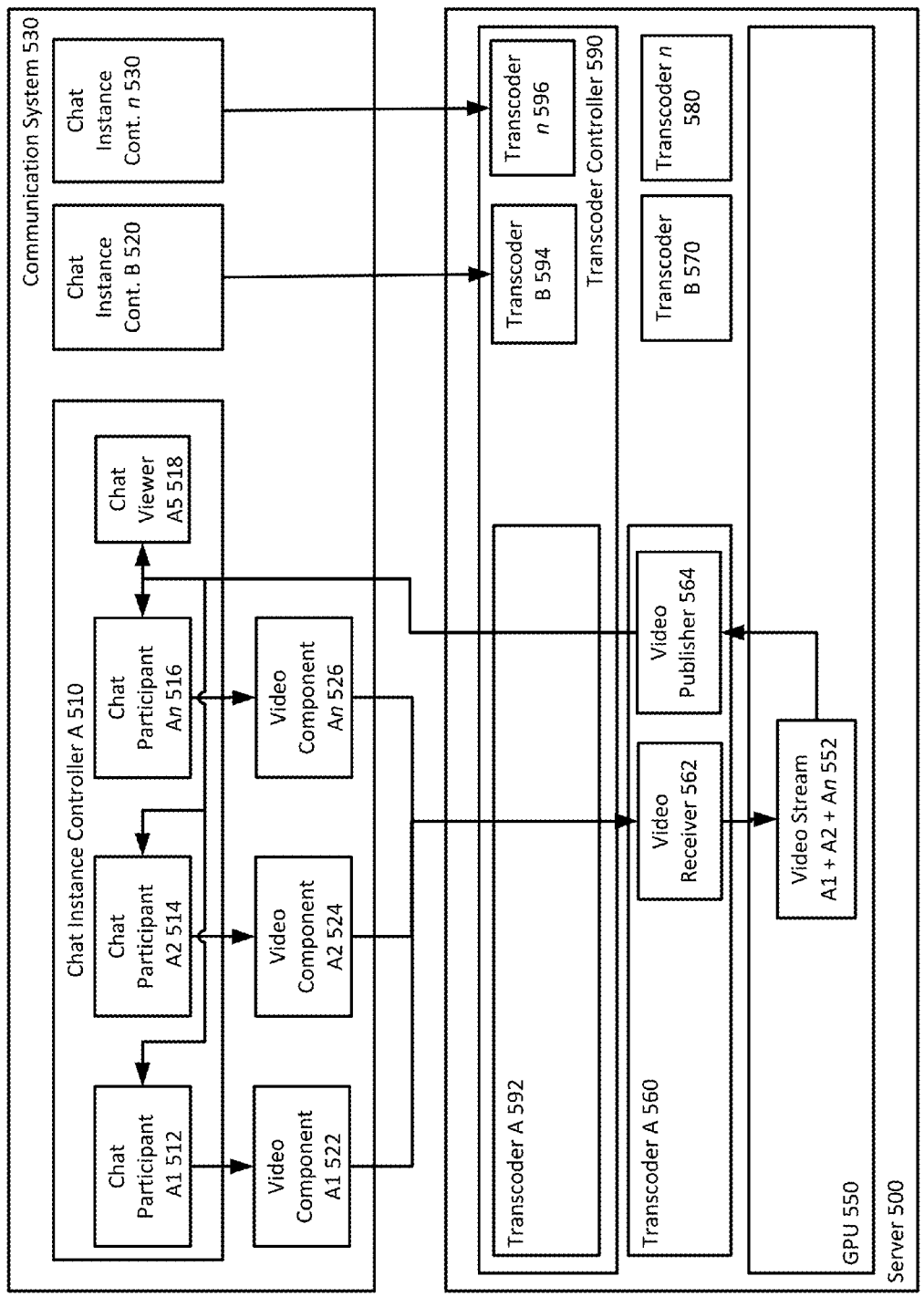
FIG. 5 is a functional diagram of a server for video encoding.

FIG. 5 is a functional diagram of server 500 and a communication system for video encoding 530. The server 500 is one of the servers in a server cluster, such as server cluster 450 in FIG. 4. The communication system 530 may be the communication system 430 of FIG. 4. All communication in the system may be routed through the communication system 530, may utilize one or more APIs operating on the server 500 or within the various elements allocated for a particular chat instance. For example, an API within a given transcoder controller may communicate, using the communication system 530, directly with a chat instance controller for that chat instance.

The communication system 530 includes a plurality of chat instance controllers A 510, B 520, and n 530. The chat instance controller A 510, as discussed above, ensures that video received by the system that is associated with a particular chat instance is routed and returned to the appropriate chat instance for chat participants and any chat viewers.

The server 500 includes a transcoder controller 590, transcoders A 592, B 594 and n 596, and a GPU 550. The transcoder controller 590 controls the operation of the transcoders A 592, B 594, and n 596. The transcoder controllers A 592, B 594 and n 596 are responsible for directing the conversion of audio and video components received from their respective chat instance controllers A 510, B 520, and n 530 into combined or master audio or video streams while under the direction of transcoder controller 590. The transcoding takes place on the GPU 550.

Each transcoder, such as transcoder A 560, includes a video receiver, such as video receiver 562, and a video publisher, such as video publisher 564. Each video receiver 562 receives each of the video components for the chat instance controller associated with the transcoder. For example, the video receiver 562 for transcoder A 560 receives the video components A1 522, A2 524, and An 526 associated with chat instance controller A 510.

The video components are then provided by the video receiver 562 to the GPU 550 to be combined into video stream A1+A2+An 552. Once the video components are combined into a master video stream, the master stream is provided to the video publisher 564 that ensures that the master video stream reaches all of the chat participants A1 512, A2 514, An 516 and any chat viewers, such as chat viewer A5 518 associated with chat instance controller A 510.

The chat instance controller A 510, and all other chat instance controllers on a given communication system 530, are made up of data objects that incorporate a unique chat ID which is associated with a set of chat participants and any chat viewers. In this case, chat participant A1 512, chat participant A2 514, and chat participant An 516 make up chat instance A, operating on chat instance controller A 510 allocated to that chat instance. Chat viewer 518 may be associated with chat instance A and, similarly, operate on chat instance controller 510 as a chat viewer (not a chat participant). This means that audio and/or video components generated by these chat participants and viewers that is meant for the chat ID associated with chat instance A will be appropriately routed by the chat instance controller A 510 to these chat participants and chat viewers. Similarly, any resulting combined or master streams will be routed back to the appropriate chat participants and chat viewers.

The chat instance controller 510 may receive (from the chat router 444, through the communication interface 432), as a part of an ongoing chat instance, such as chat instance A, video components from the chat participants. Examples of such video components are shown as video component A1 522, video component A2 524, and video component An 526.

These components are routed to a transcoder controller A 592 allocated on the server 500 for a chat instance A. In this case, video components associated with chat instance A are routed to transcoder controller A 592. Similarly, video components associated with chat instance B 520 are routed to transcoder controller B 594 and to transcoder B 570 associated with chat instance controller B 520. Video components associated with chat instance n 530 are routed to transcoder controller n 596 and to transcoder n 580. The transcoders, such as transcoder A 560, accept a plurality of video components, prepare those components for encoding, and package those components for encoding using GPU 550.

The GPU 550 within the server 500 is used for encoding into a single video stream including the video components of A1 522, A2 524 and An 526. This is encoded as video stream A1+A2+An 552. User and/or server settings may determine how this encoding takes place. For example, the videos may be overlaid, may be boxed into set portions of an overall stream (when displayed) or may otherwise be organized into a single master A1+A2+An 552 stream. In addition, timing data may be transmitted with the video components in order to enable the GPU to properly synchronize video data that is not necessarily received simultaneously from all of the chat participants. This same master stream may then be returned to all of the chat participants A1 512, A2 514, An 516 and to any chat viewers, such as chat viewer A5 518.

This master stream may be transmitted using user datagram protocol (UDP). UDP prioritizes throughput over ensured delivery. In this way, the master stream is continuously sent, regardless of whether a particular chat participant or chat viewer has received or acknowledged delivery. The most important priority is ensuring that the master stream continues to be sent, not ensuring that every participant (one or more may have intentionally or unintentionally dropped out of the chat) has received every frame of video or audio.

The resulting video stream utilizes substantially less bandwidth than directly providing each, individual video component to each of the chat participants and each chat viewer for combination therein. Similarly, this process utilizes less CPU cycles on any one of the chat participant computing devices than would be necessary for that computing device to encode all of the video into a single stream or for each participant or viewer computing device to simultaneously receive, decode, synchronize and then display each of these video components. This is particularly acute when there are many chat participants and each of the chat participant's resulting video streams or when many or all of the chat participants are on mobile devices.

The use of a server, such as server 500 at all is unusual in these types of systems. Typically, these systems rely upon the computing power of one or more of the chat participant's computing devices to encode some or all of the video for each of the chat participants in a given video chat session. Particularly in the context of an entirely-mobile video chat session, the chat participant computing devices are not necessarily capable of performing this function. The bandwidth considerations and latency issues related to mobile devices in addition to the more-limited computing power associated with such devices makes using those devices to perform these functions difficult or impractical.

As a result, a server, such as server 500, is used to perform these functions. However, again, utilizing a single server to perform the encoding of more than a few (3-5) simultaneous chats involving a few (3-5) chat participants results in that server being overloaded and, in some cases, ceasing to function or becoming otherwise unavailable. The raw data associated with multiple video streams alone is very bandwidth and memory intensive. A single server has difficulty keeping up with such huge volumes of data, both in network bandwidth and in CPU throughput. Adding additional servers is an option, but each additional server costs money to initialize, to maintain and to administer. The costs associated with providing an individual, dedicated server for each set of only a few simultaneous on-going audio-visual chat sessions makes continued allocation of additional servers prohibitive.

As a result, the present system may use servers which incorporate a plurality of GPUs operating simultaneously within each of the servers to provide additional processing power necessary to overcome the single-server limitations regarding a total number of simultaneous chat sessions. In particular, the GPU's direct access to high-speed memory and the GPUs capability to simultaneously operate on large chunks of data enable the GPUs to quickly synchronize and encode multiple, simultaneous video components into a plurality of combined and master video streams. The CPU, the primary processor for a server, may primarily operate the transcoder controller 590 for a given server 500 and direct the various video streams to their appropriate places where they may then be operated upon by the GPUs. In this way, a single server, having at least one GPU, of current, typical capability may handle anywhere from 5-100 simultaneous chats involving three or more individual chat participants and any number of chat viewers. Additional simultaneous chats may be possible under the same system using later server and GPU technology.

The GPU 550 encoding the video uses lock-free memory, meaning that no single chat participant or chat instance can make any part of the data in memory un-editable. This serves to enable the encoding process to continue operating even if one or more chat participants have high latency or are non-responsive. In addition, incoming new video components are not skipped in the encoding process. So, for example, if additional video data comes in for one chat participant while the remaining chat participants have yet to provide data, the video for the single chat participant is encoded along with the last video component received for the remaining chat participants so as to continue the master video stream advancing, even though only a single participant has provided new data. The GPU does not "lock" any data awaiting input from other chat participants.

In addition, the GPU 550 may utilize blocking of data such that large collections of data are operated upon simultaneously. These collections may be time-allocated, meaning that they are allocated in collections based upon when the video components arrive at the GPU 550. These collections may be type-allocated, meaning that similar video portions that are received within a reasonable time-frame of one another may be grouped for processing because the GPU 550 can perform similar operations at once on different collections of data.

Figure 6:
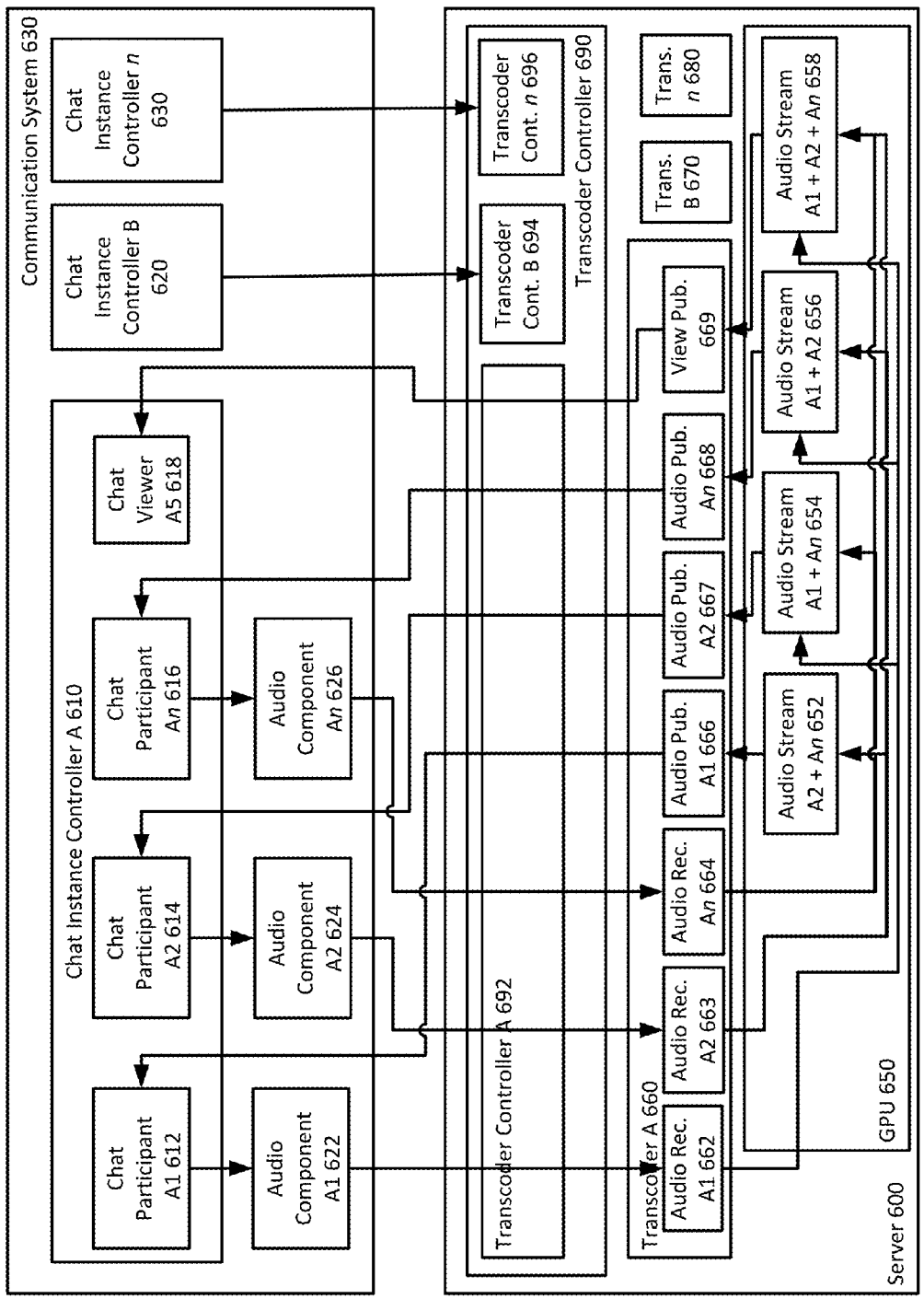
FIG. 6 is a functional diagram of a server for audio encoding.

FIG. 6 is a functional diagram of a server 600 and a communication system 630 for audio encoding. The communication system 630 incorporates all of the elements of the communication system 530 in FIG. 5. The chat instance controller A 610, chat instance controller B 620, the chat instance controller n 630, the transcoder controller 690 and the GPU 650 may serve virtually identical functions to that described above with reference to FIG. 5, except those systems function in the same manner with regard to audio components and combined or master audio streams rather than video components and streams. Those descriptions will not be repeated here.

Unlike the video transcoding described above, each audio transcoder, such as transcoder A 660, includes an audio receiver for each chat participant in an associated chat instance controller, such as chat instance controller A 610. Similarly, an audio publisher for each chat participant, along with a single audio publisher used for each chat viewer is provided. For chat instance controller A 610, there are three chat participants, A1 612, A2 614, and An 616 along with a single chat viewer A5 618. Accordingly, there are three audio receivers A1 662, A2 663, and An 664, three audio publishers A1 666, A2 667, and An 668, and one viewer publisher 669.

The audio components A1 622, A2 624, and An 626 are each received in transcoder A 660 at their respective audio receivers A1 662, A2 663, and An 664. These are passed to the GPU 650 for encoding.

Once the GPU 650 receives audio components A1 622, A2 624, and An 626 from the transcoder A 660, the GPU 650 simultaneously encodes n combined audio streams where n is the total number of chat participants. Each of these individual combined audio streams incorporates all of the audio associated with every chat participant except for one. The GPU 650 then returns the n combined audio streams to the respective audio publisher in transcoder A 660 which routes the combined audio streams such that the missing audio component for a given chat participant is their own audio component.

The audio publisher A1 666 receives the audio stream A2+An 652, the audio publisher A2 667 receives the audio stream A1+An 654, and the audio publisher An 668 receives audio stream A1+A2 656. Finally, the viewer publisher 669 receives a master audio stream A1+A2+An 658. Audio publisher A1 666 passes the received audio stream A2+An 652 to chat participant A1 612. Audio publisher A2 667 passes the received audio stream A1+An 654 to chat participant A2 614. Audio publisher An 668 passes the received audio stream A1+A2 656 to chat participant An 616. Chat viewer A5 618 receives the master audio stream A1+A2+An 658.

Among other benefits, this results in none of those participants receiving a so-called "echo" effect wherein their own audio is repeated and reverberates in their own microphone/speaker combination and results in substantial feedback or all chat participants. In addition, this results in less bandwidth usage.

Any chat viewers, such as chat viewer A5 618, receive a master audio stream A1+A2+An 658 incorporating all audio components that are also encoded by the GPU and transmitted, through the chat instance controller 610, to all chat viewers, such as chat viewer A5 618. In this way, the chat viewers receive all audio along with the master video discussed with reference to FIG. 5.

As with the video components above, a CPU in a server can quickly be overwhelmed by the encoding of multiple audio components, for multiple chat participants across multiple, simultaneous chats. The user of a plurality of GPUs to synchronize and encode the audio for each of the on-going chats enables a single current server to handle 10-80 simultaneous chats. Future servers, incorporating better GPUs may increase this number dramatically.

Description of Processes

Figure 7:
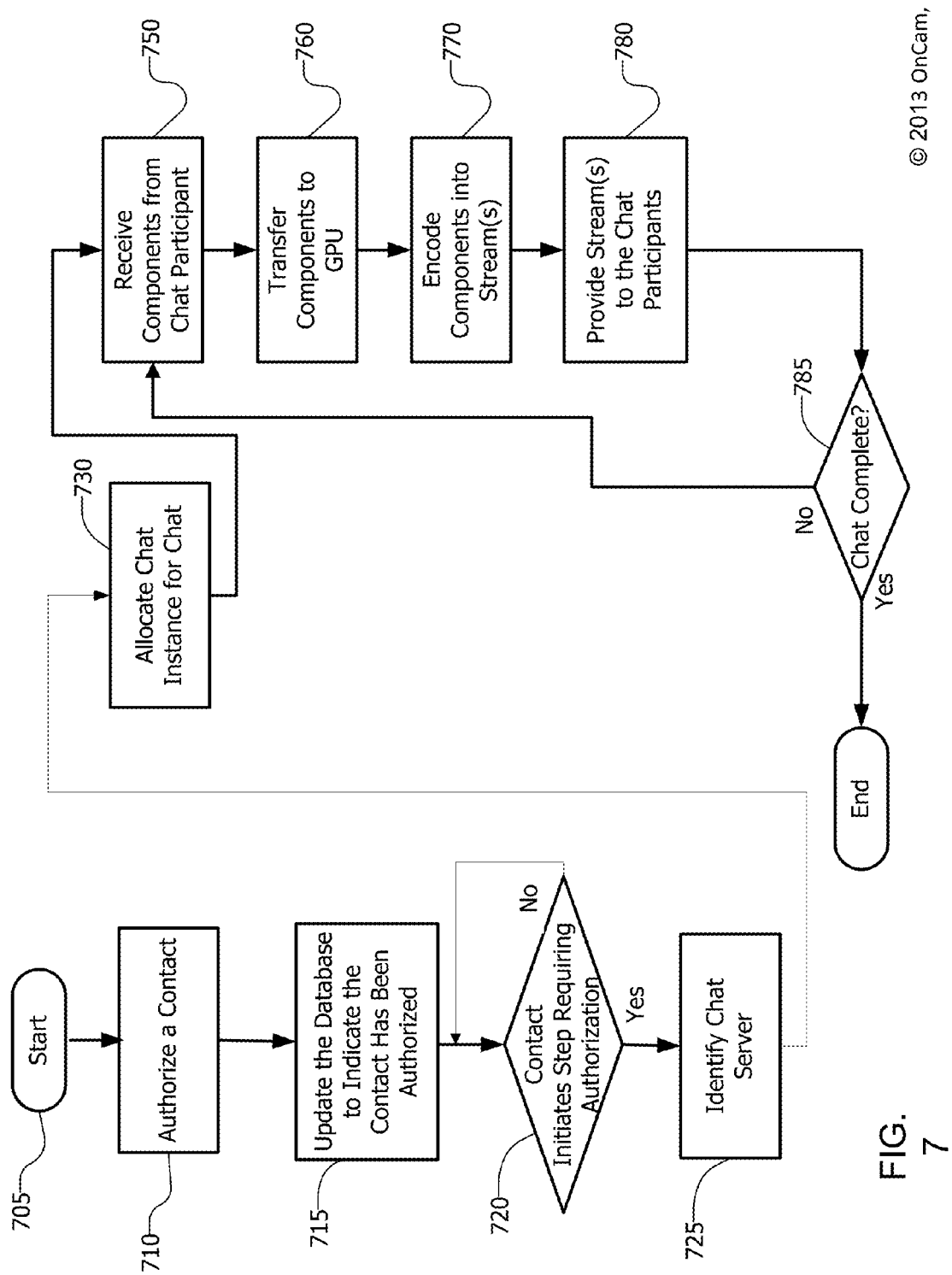
FIG. 7 is a flowchart for chat preauthorization.

Referring to FIG. 7, a flowchart for chat preauthorization is shown. Chat preauthorization is the process whereby a chat participant pre-authorizes, or grants permission, to another chat participant to have automatic access to the audio and/or video components of the chat participant, without the other chat participant needing to take any subsequent actions. The chat preauthorization process may be used in various scenarios. For example, the chat preauthorization may be used to allow a target chat participant to grant permission to a source chat participant to drop-in on the target chat participant. Alternatively, the chat preauthorization process may be used to allow a source chat participant's audio and/or video components to be transmitted to the target chat participant when a source chat participant initiates a chat session with the target chat participant. Finally, the chat preauthorization process may be used to allow target chat participants to view the audio and/or video components of a source chat participant when a source chat participants elects to "broadcast" his stream to his target chat participants. These are examples of scenarios that can utilize the chat preauthorization process. The chat preauthorization process is not limited to these scenarios.

FIG. 7 has both a start 705 and an end 795, but the process is cyclical in nature, particularly with regard to the encoding-related steps. One or more of the computing devices identified above may be programmed to carry out these steps using these steps as their algorithm.

The process starts at 710, whereby a chat participant authorizes a contact, or another chat participant to have permission to view the audio and/or video components. For example, for a source chat participant to be able to send his audio and/or video components when initiating a chat session with a target chat participant, he would first need to authorize the target chat participant to receive his audio and/or video components. To authorize a contact, the chat participant would need to select the contact from his contact list and select to authorize that contact to have permission to view the audio and/or video components. To grant permission to transmit the audio and/or video components to the target chat participant when a chat session with the target chat participant is initiated, the source chat participant likely would use his mobile device, such as mobile device 110 from FIG. 1. To select the target chart participant that he wants to pre-authorize, the source chat participant may grant drop-in permission specifically to the target chat participant. Alternatively, a source chat participant could make this a global setting whereby all target chat participants would be pre-authorized to receive the source chat participant's audio and/or video components when the source chat participant initiates a chat request.

The process then proceeds to 715 whereby a database is updated to indicate that the contact has been authorized.

When the target chat participant is authorized to receive the source chat participant's audio and/or video components, a source chat participant data database, such as user data database 449 from FIG. 4, may be updated to store the contact identifiers for the target chat participants who have been authorized. Therefore, if the source chat participant chooses to use his mobile device, or a client system, the target chat participant will appear in a list of target chat participants who are to receive the source chat participant's audio and/or video components when the source chat participant initiates a chat session with the target chat participant. The cluster controller system, such as cluster controller system 440 in FIG. 4, may include a user data database, such as user data database 449, to store a source chat participant's settings and list of the source chat participant's contacts that are stored in a database associated with the source chat participant.

For example, user data database 449 in FIG. 4, may include a database to store data relating to target chat participants that a source chat participant adds to an authorization list to receive audio and/or video components when the source chat participant initiates a chat session with the target chat participant. The user data database 449 may store a target chat participant identifier to quickly determine if the target chat participant has been authorized to receive audio and/or video components when the source chat participant initiates a chat session with the target chat participant. The user data database 449 will only store a target chat participant identifier if a source chat participant has authorized the target chat participant.

Once the source chat participant has authorized the target chat participant, then the source chat participant has granted permission to the target chat participant such that when the source chat participant initiates a chat session with the target chat participant, the source chat participant's audio and/or video components will be transmitted to the target chat participant.

The process then proceeds to 720 whereby the system checks whether the contact has initiated the step that requires the pre-authorization. In other words, if the source chat participant has authorized the target chat participant to receive the source chat participant's audio and/or video components when the source chat participant initiates a chat session, then the system will check whether the source chat participant has initiated a chat session with the target chat participant.

If the contact has not initiated the pre-authorization action, then the process will return to 720 to continue waiting until the contact has initiated such action. If the contact has initiated the action, then the process will continue to 725 to identify a chat server. The system will identify a chat server and the cluster controller system may allocate a chat instance for the requested chat. This may involve creating a unique chat ID, associating a particular chat instance on a server of the server cluster 450 for the chat. After the chat instance has been allocated, the video encoding begins.

The cluster controller system 440 may allocate a chat instance for the requested chat at 730. This involves creating a unique chat ID, associating a particular chat instance on a server of the server cluster 450 for the chat.

After the chat instance has been allocated at 730, the process of video encoding begins. In some instances, only the audio and/or video components from one of the chat participants will be transmitted. In other instances, both chat participant's audio and/or video components will be transmitted through the system. If both chat participant's audio and/or video components are being transmitted, then each of the computing devices, such as the mobile device 110 or client system 120, associated with a chat participant begins providing audio and/or video components, along with a unique user ID and chat ID, to the allocated server at 750. These audio and/or video components are for inclusion in the overall on-going chat. The audio and/or video components are then transmitted to the server allocated to the chat by the cluster controller system 440.

The server then transfers those audio and/or video components to one of a plurality of GPUs operating on the server for encoding at 760. The GPU or GPUs encode the individual video components into a plurality of combined audio streams and a master video stream at 770. This involves the synchronization of the audio and/or video components that are not necessarily received in order or at the same time. Timestamps, internal or otherwise may be used to accomplish this. In addition, this process may, for example, involve encoding of the video into a single master video stream with each of the source chat participant's and target chat participant's real-time images superimposed over a background or "tiled" across a screen as desired by the source chat participant or target chat participant. The audio may be encoded into a series of combined audio streams, each including all but one of the audio components provided by the chat participants, as described above.

The server may maintain two separate streams of the target chat participant's video and audio components and the source chat participant's video and audio components. Alternatively, the server may combine both the target chat participant's and the source chat participant's streams into one stream. If the streams are combined, then the system returns the combined audio streams and the master video stream to the source chat participant and the target chat participant at 780. The source chat participant and the target chat participant may then see the real-time master video stream and hear the relevant combined audio stream. Alternatively, the streams may not be combined. For example, in some drop-in scenarios, the target chat participant may only see the source chat participant's audio and/or video component, but the source chat participant may see the source chat participant and the target chat participant's video stream along with the target chat participant's audio stream. In such a scenario, the streams may not be combined because each chat participant may not be viewing the same components.

Next, a determination of whether the chat is complete at 785 is made. If the chat is complete, the process ends at 795. The chat is complete if the chat participants have terminated the chat. If the chat is not complete (i.e. at least two of the chat participants are still active in the chat), then the process returns to 750 to continue receiving audio and/or video components from each chat participant.

Figure 8:
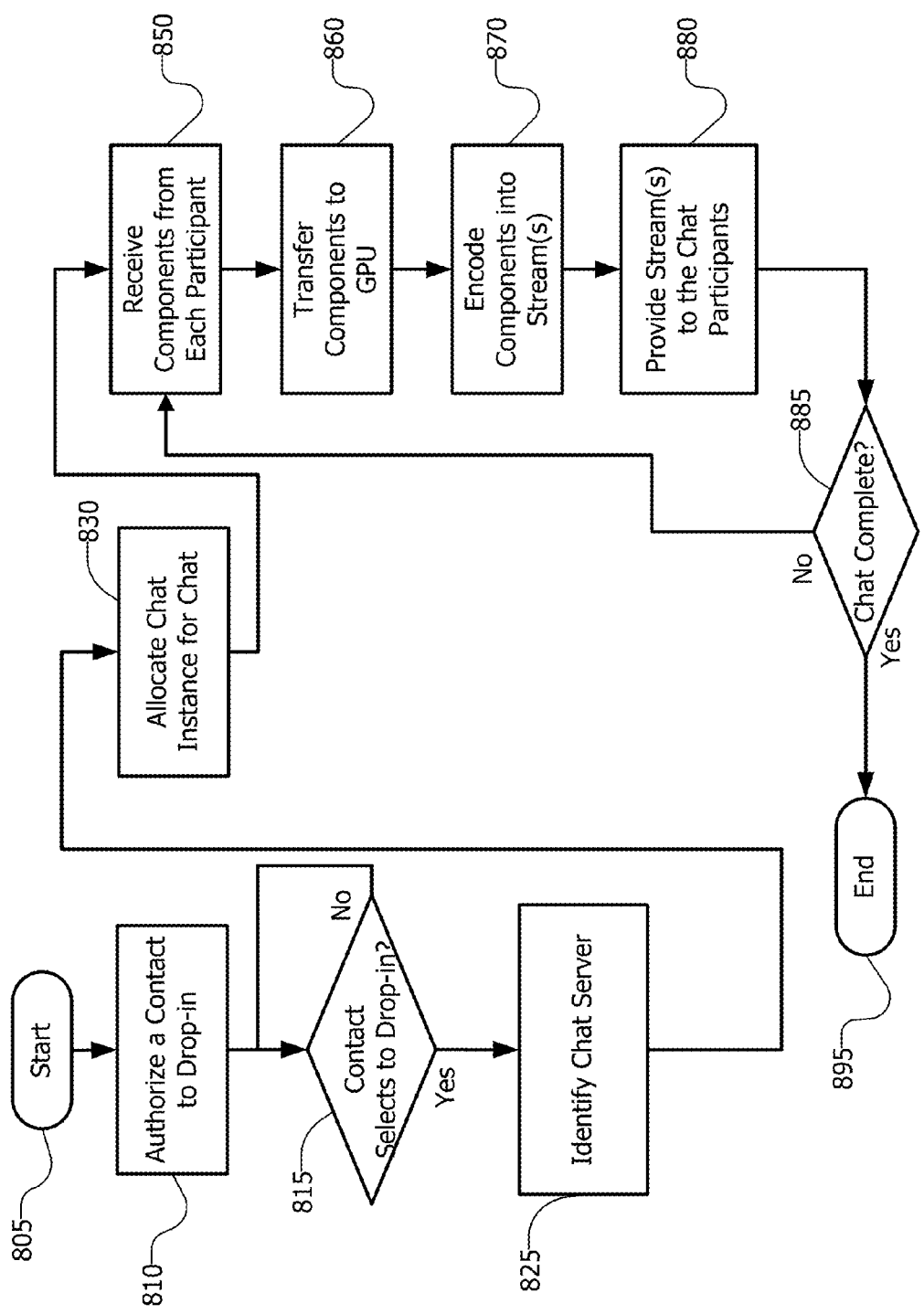
FIG. 8 is a flowchart for chat preauthorization.

Referring now to FIG. 8, a flowchart for chat preauthorization is shown. Specifically, FIG. 8 shows a flowchart for chat preauthorization to allow initiating a one-click audio-visual chat. FIG. 8 has both a start 805 and an end 895, but the process is cyclical in nature, particularly with regard to the encoding-related steps. One or more of the computing devices identified above may be programmed to carry out these steps, using these steps as their algorithm.

The process starts with a target chat participant authorizing a source chat participant from his contact list to drop-in at 810. The target chat participant may use a mobile device, such as mobile device 110 from FIG. 1, to select a source chat participant from the target chat participant's list of contacts stored on the mobile device. For example, a target chat participant may add all of the source chat participants that he follows to his drop-in list. Alternatively, a target chat participant may only add select chat participants that he follows to his drop-in list. Once the target chat participant has decided which source chat participant, or source chat participants, to authorize to drop in on the target chat participant, the target chat participant selects the source chat participant and adds the source chat participant to a list of source chat participants who are authorized to drop in on the target chat participant. The source chat participant then has been authorized, or granted permission, to drop-in on the target chat participant.

Once the source chat participant has been added to the target chat participant's drop-in list, the source chat participant can view the target chat participant's audio and/or video stream without any subsequent authorization by the target chat participant necessary. If the target chat participant has not set a block period, then the source chat participant can start viewing the target chat participant's audio and/or video stream immediately. If a block period has been set, then the source chat participant may view the target chat participant's audio and/or video stream after the block period has ended. Alternatively, if the target chat participant's audio and/or video components are not available, then the source chat participant may view the target chat participant's audio and/or video stream after the audio and/or video component is available.

When the source chat participant is added to the target chat participant's drop-in list, a target chat participant data database, such as user data database 449, may be updated to store the status of drop-in authorization with respect to the source chat participant. Therefore, if the target chat participant chooses to use a mobile device, or a client system, the source chat participant will appear in a list of source chat participants available for drop-in on whatever device is used by the target chat participant. The cluster controller system, such as cluster controller system 440 in FIG. 4, may include a user data database, such as user data database 449, to store a target chat participant's settings and list of the target chat participant's contacts that are stored in a database associated with the target chat participant.

For example, user data database 449 in FIG. 4, may include a database to store data relating to source chat participants that a target chat participant adds to a drop-in list. The user data database 449 may store a source chat participant identifier to quickly determine if the source chat participant has been authorized to initiate a one-click chat. The user data database 449 will only store a source chat participant identifier if a target chat participant has authorized the source chat participant to drop-in. The source chat participant will only be given the option to drop-in on a target chat participant, if the target chat participant has authorized the source chat participant to drop-in.

Once the source chat participant has been added to the target chat participant's authorized list of people who can initiate a one-click chat, the source chat participant can select the target chat participant and drop-in on the target chat participant. In some situations, the source chat participant may drop-in on the target chat participant anytime. Alternatively, the target chat participant may set a time period to block any requests from source chat participants who want to drop-in on the target chat participant. If a target chat participant sets a block period, then source chat participants will not be permitted to drop-in on the target chat participant during the block period. At 815, the system determines if the source chat participant has selected to drop-in on the target chat participant. A source chat participant who has been authorized to drop-in on a target chat participant will have the option to drop-in on the target chat participant, usually by pressing a unique drop-in button. If the target chat participant has not authorized the source chat participant, then the source chat participant will not see the drop-in feature next to the target chat participant's contact information.

In some situations, when a target chat participant has authorized a source chat participant to drop-in, but the source chat participant has not authorized the target chat participant to drop-in, then when the target chat participant initiates a phone call with the source chat participant, the source chat participant may automatically see the target chat participant as the call is ringing on the source chat participant's phone. In other words, as the target chat participant is calling the source chat participant, because the target chat participant has already authorized the source chat participant to drop in, the source chat participant will see the target chat participant's audio and/or video stream as his phone is ringing.

After the source chat participant has selected to initiate a one-click chat, the system proceeds to 825 where the system identifies a chat server. This process, which may be undertaken by the cluster controller system 140 (FIG. 1), involves the load balancing functionality of the cluster control system 440 (FIG. 4) to ensure that a given server is capable of handling the requested chat. For example, a test may determine that a CPU load is above a pre-determined threshold (e.g. 80%) and require that the cluster control system 440 allocate a new server on the server cluster 450 in order to host the requested chat.

The cluster controller system 440 may allocate a chat instance for the requested chat at 730. This involves creating a unique chat ID, associating a particular chat instance on a server of the server cluster 450 for the chat.

After the chat instance has been allocated at 830, the process of video encoding begins. Each of the computing devices, such as the mobile device 110 or client system 120, associated with a chat participant begins providing audio and/or video components, along with a unique user ID and chat ID, to the allocated server at 850. These audio and/or video components are for inclusion in the overall on-going chat. For example, once the source chat participant selects to drop-in on the target chat participant, the target chat participant's associated device begins providing a video component. That is, if the target chat participant is using his mobile device, then the mobile device will begin providing the audio and/or video components. If the target chat participant is using a client system, the client system will begin providing the target chat participant's audio and/or video component. These audio and/or video components are then transmitted to the server allocated to the chat by the cluster controller system 440. The source chat participant's audio and/or video components are also transmitted to the server allocated to the chat instance.

The server then transfers those audio and/or video components to one of a plurality of GPUs operating on the server for encoding at 860. The GPU or GPUs encode the individual video components into a plurality of combined audio streams and a master video stream at 870. This involves the synchronization of the audio and/or video components that are not necessarily received in order or at the same time. Timestamps, internal or otherwise may be used to accomplish this. In addition, this process may, for example, involve encoding of the video into a single master video stream with each of the source chat participant's and target chat participant's real-time images superimposed over a background or "tiled" across a screen as desired by the source chat participant or target chat participant. The audio may be encoded into a series of combined audio streams, each including all but one of the audio components provided by the chat participants, as described above.

The server may maintain two separate streams of the target chat participant's video and audio components and the source chat participant's video and audio components. Alternatively, the server may combine both the target chat participant's and the source chat participant's streams into one stream. If the streams are combined, then the system returns the combined audio streams and the master video stream to the source chat participant and the target chat participant at 880. The source chat participant and the target chat participant can see the real-time master video stream and hear the relevant combined audio stream. Alternatively, the streams may not be combined. For example, in some drop-in scenarios, the target chat participant may only see the source chat participant's audio and/or video component, but the source chat participant may see the source chat participant and the target chat participant's video stream along with the target chat participant's audio stream. In such a scenario, the streams may not be combined because each chat participant may not be viewing the same components.

Next, a determination of whether the chat is complete at 885 is made. If the chat is complete, the process ends at 895. The chat is complete if the chat participants have terminated the chat. If the chat is not complete (i.e. at least two of the chat participants are still active in the chat), then the process returns to 850 to continue receiving audio and/or video components from each chat participant.

The process described is the process for allowing a source chat participant to initiate a one-click chat with a target chat participant. From the perspective of the target chat participant, this process is referred to generally as the "Drop in on me" process. That is, the "Drop in on me" process describes the process of the target chat participant authorizing source chat participants to drop in on the target chat participant and then the source chat participant dropping in on the target chat participant. From the perspective of the source chat participant, this process is generally referred to as the "Drop-in on them" process. The source chat participant may have an interface that identifies the target chat participants that have granted permission for the source chat participant to drop in on them.

The process for allowing a target chat participant to drop in on a source chat participant is similar to allowing a source chat participant to drop in on a target chat participant. Specifically, the source chat participant first must authorize the target chat participant to initiate a one-click chat, just as in step 810 of FIG. 8. Once the source chat participant has authorized the target chat participant to initiate a one-click chat, or drop-in on the source chat participant, then the target chat participant can select to chat with the source chat participant at anytime using one-click. That is, the target chat participant could select to drop in on the source chat participant, as shown in step 815 of FIG. 8. The target chat participant is only permitted to drop-in on the source chat participant, if the source chat participant has already granted permission for the target chat participant to drop in. The target chat participant likely will see a "drop-in" or similar button next to the source chat participant's contact information, only after the source chat participant has already authorized the target chat participant to drop in on the source chat participant. After the target chat participant has selected to drop-in, the process will perform steps 825-885 of FIG. 8 to identify a chat server and perform the video encoding required to transmit the video stream to the source chat participant and the target chat participant.

Figure 9:
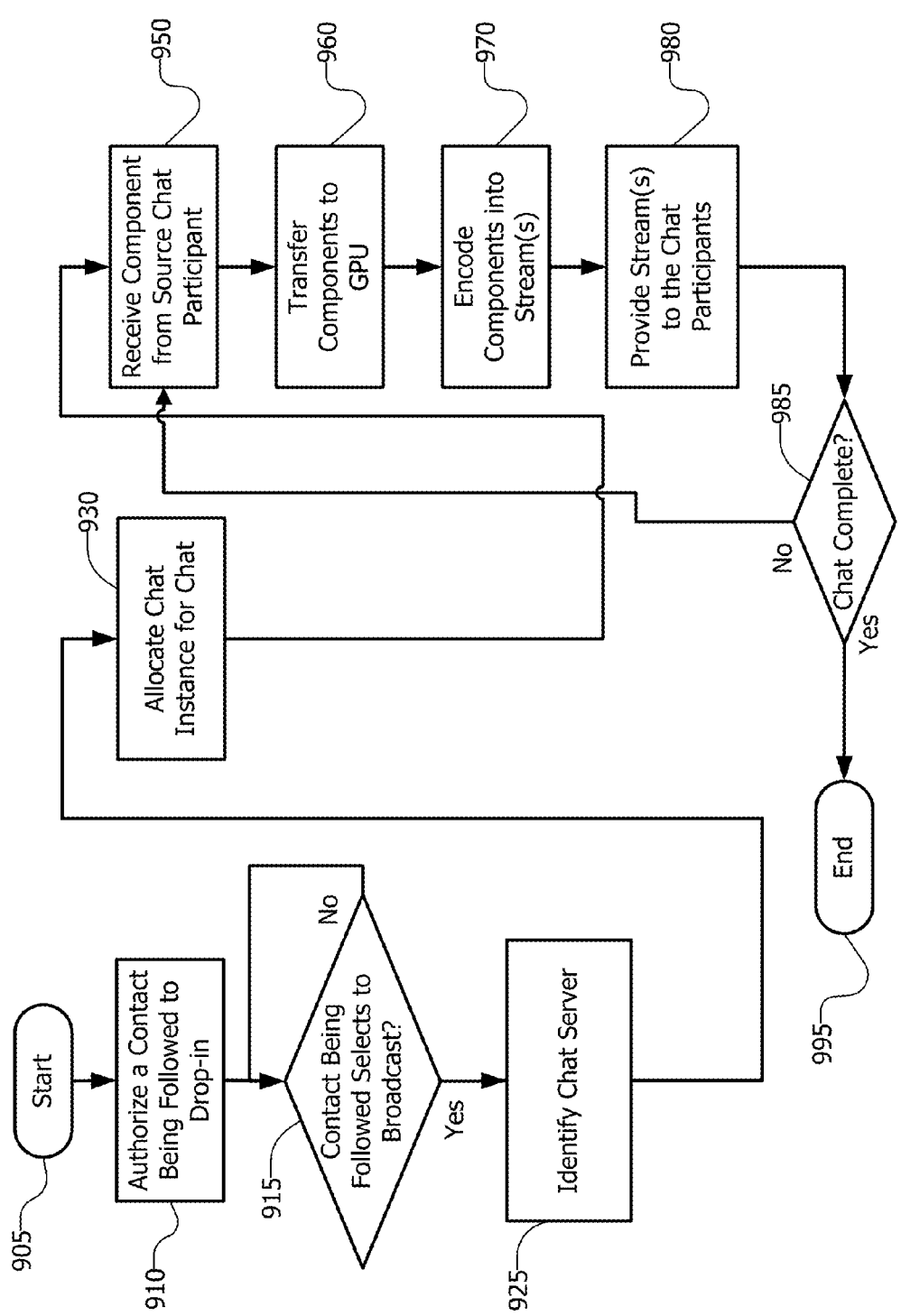
FIG. 9 is a flowchart for chat preauthorization.

FIG. 9 is a flowchart for chat preauthorization. Specifically, FIG. 9 shows the process whereby a source chat participant may "broadcast" to his followers thereby dropping-in on his followers. The process begins at 910 when a target chat participant authorizes a source chat participant to drop-in. The target chat participant would use his mobile device, or client system, to authorize someone he is following to drop-in on him.

The process then proceeds to 915, where the source chat participant, or the person being followed, selects to broadcast his stream to his followers. In other words, the source chat participant selects to broadcast his audio and/or video stream to his followers. After the source chat participant selects to broadcast his stream, the process proceeds to 925 where a chat server is identified. This process, which may be undertaken by the cluster controller system 140 (FIG. 1), involves the load balancing functionality of the cluster control system 440 (FIG. 4) to ensure that a given server is capable of handling the requested chat. For example, a test may determine that a CPU load is above a pre-determined threshold (e.g. 80%) and require that the cluster control system 440 allocate a new server on the server cluster 450 in order to host the requested chat.

After the chat server is identified, a chat instance is allocated. The cluster controller system 440 may allocate a chat instance for the requested chat at 930. This involves creating a unique chat ID, associating a particular chat instance on a server of the server cluster 450 for the chat.

After the chat instance is allocated, the source chat participant's audio and/or video components will be transmitted to the system. In this embodiment, the source chat participant's audio and/or video components will be transmitted to his followers, but the source chat participant will not see the target chat participant's audio or video components, unless the source chat participant actively requests it. In this embodiment, the source chat participant's computing device, either his mobile device or the client system, will begin providing the audio and/or video components, along with a unique user ID and chat ID, to the allocated server at 950. These audio and/or video components are then transmitted to the server allocated to the chat by the cluster controller system 440.

The server then transfers those audio and/or video components to one of a plurality of GPUs operating on the server for encoding at 960. The GPU or GPUs encode the individual video components into a plurality of combined audio streams and a master video stream at 970. This involves the synchronization of the audio and/or video components that are not necessarily received in order or at the same time. Timestamps, internal or otherwise may be used to accomplish this. In addition, this process may, for example, involve encoding of the video into a single master video stream with each of the source chat participant's and target chat participant's real-time images superimposed over a background or "tiled" across a screen as desired by the source chat participant or target chat participant. The audio may be encoded into a series of combined audio streams, each including all but one of the audio components provided by the chat participants, as described above.

At 980, the source chat participant's audio and/or video streams are provided to the source chat participant's followers who authorized the source chat participant to drop-in. Next, a determination of whether the chat is complete at 985 is made. If the chat is complete, the process ends at 995. The chat is complete if the source chat participant has stopped broadcasting his stream. If the chat is not complete (i.e. the source chat participant has not stopped broadcasting his stream), then the process returns to 950 to continue receiving audio and/or video components from each chat participant.

The process of granting permission to a chat participant, or pre-authorizing a chat participant, can be used in other ways. For example, the aspect of pre-authorizing a chat participant can be used in the following scenario. A source chat participant can grant permission, or authorize, a target chat participant to access the source chat participant's audio and/or video components. The source chat participant may identify that the source chat participant's audio and/or video components are to be transmitted to the target chat participant when the source chat participant initiates a chat session request with the target chat participant. In this case, the source chat participant's audio and/or video components would be transmitted to the target chat participant before the target chat participant accepts the chat session request, and the target chat participant would not be transmitting any audio and/or video data.

To grant permission to transmit the audio and/or video components to the target chat participant when a chat session with the target chat participant is initiated, the source chat participant likely would use his mobile device, such as mobile device 110 from FIG. 1. To select the target chart participant that he wants to pre-authorize, the source chat participant may grant drop-in permission specifically to the target chat participant. Alternatively, a source chat participant could make this a global setting whereby all target chat participants would be pre-authorized to receive the source chat participant's audio and/or video components when the source chat participant initiates a chat request. Once the source chat participant has authorized the target chat participant, then the source chat participant has granted permission to the target chat participant such that when the source chat participant initiates a chat session with the target chat participant, the source chat participant's audio and/or video components will be transmitted to the target chat participant.

When the target chat participant is authorized to receive the source chat participant's audio and/or video components, a source chat participant data database, such as user data database 449 from FIG. 4, may be updated to store the contact identifiers for the target chat participants who have been authorized. Therefore, if the source chat participant chooses to use his mobile device, or a client system, the target chat participant will appear in a list of target chat participants who are to receive the source chat participant's audio and/or video components when the source chat participant initiates a chat session with the target chat participant. The cluster controller system, such as cluster controller system 440 in FIG. 4, may include a user data database, such as user data database 449, to store a source chat participant's settings and list of the source chat participant's contacts that are stored in a database associated with the source chat participant.

For example, user data database 449 in FIG. 4, may include a database to store data relating to target chat participants that a source chat participant adds to an authorization list to receive audio and/or video components when the source chat participant initiates a chat session with the target chat participant. The user data database 449 may store a target chat participant identifier to quickly determine if the target chat participant has been authorized to receive audio and/or video components when the source chat participant initiates a chat session with the target chat participant. The user data database 449 will only store a target chat participant identifier if a source chat participant has authorized the target chat participant.

Once the target chat participant has been added to the source chat participant's authorized list of people who can receive the source chat participant's audio and/or video components, then whenever the source chat participant initiates a chat session with the target chat participant, the target chat participant will immediately start receiving the source chat participant's audio and/or video components.

When a source chat participant initiates a chat request with the target chat participant, the system will determine whether the source chat participant has authorized the target chat participant to receive the source chat participant's audio and/or video components. The system may make this determination by accessing a database, such as user data database 449 from FIG. 4. If the target chat participant is authorized, then when the source chat participant sends a chat request requesting a chat session with the target chat participant, the system will automatically start providing the source chat participant's audio and/or video components to the target chat participant. The target chat participant does not need to perform any action to start receiving the source chat participant's audio and/or video components. Since the target chat participant has been authorized, the target chat participant will automatically start receiving the source chat participant's audio and/or video components.

After the chat session is initiated, the system will identify a chat server and the cluster controller system may allocate a chat instance for the requested chat. This may involve creating a unique chat ID, associating a particular chat instance on a server of the server cluster 450 for the chat. After the chat instance has been allocated, the video encoding begins. The video encoding process is similar to the process described in FIG. 8, steps 830-880.

Figure 10:
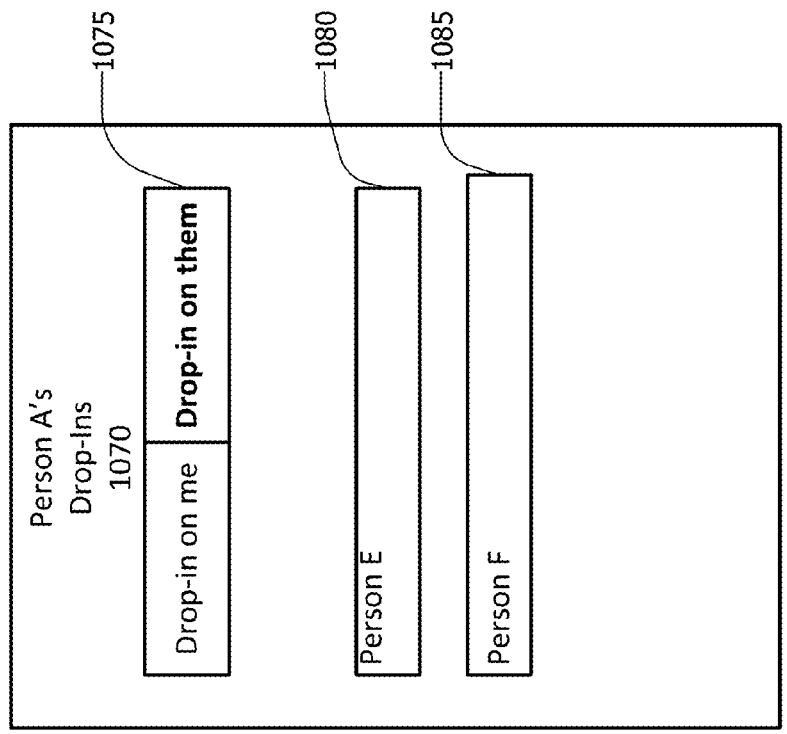
FIG. 10 is an interface for a target chat participant to configure the chat preauthorization.
Figure 10:
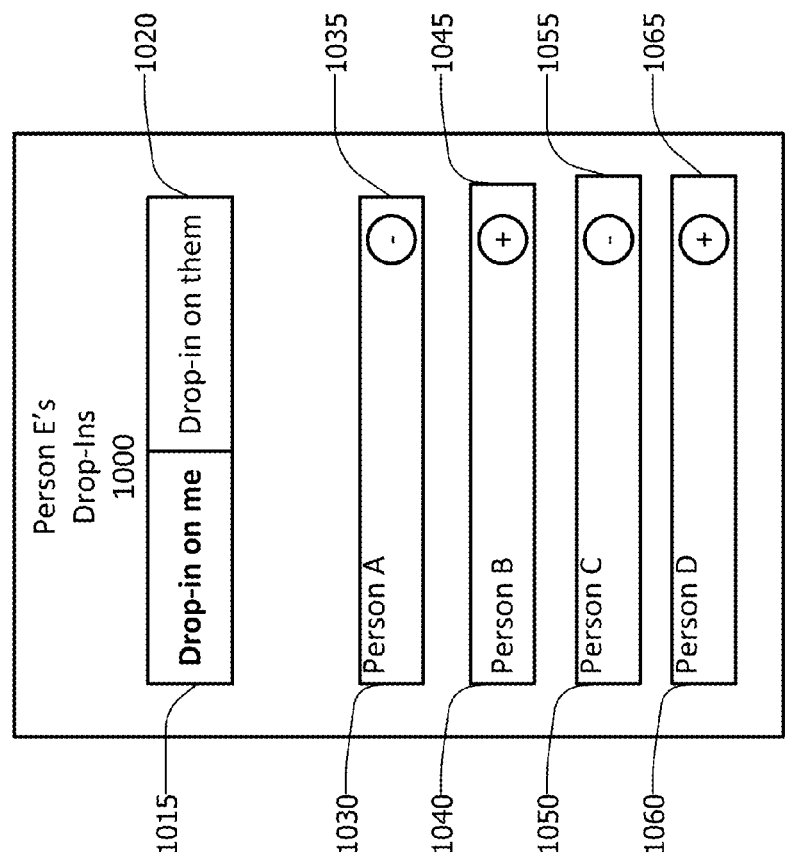

FIG. 10 is an interface for a target chat participant to configure the chat preauthorization. Specifically, FIG. 10 shows the interface 1000 for a target chat participant to pre-authorize a source chat participant to drop-in on the target chat participant. FIG. 10 also shows the interface for a source chat participant who may want to configure the chat preauthorization.

FIG. 10 shows an example interface for Person E's Drop-Ins 1000 and an example corresponding interface for Person A's Drop-Ins 1070. The interface for Person E's Drop-Ins 1000 shows buttons for a target chat participant to activate the "Drop in on me" list 1015 or "Drop in on them" list 1020.

The "Drop in on me" list 1015 includes source chat participants who have been authorized to drop in on the user. This list 1015 is created when a target chat participant selects a source chat participant and adds that source chat participant to the target chat participant's Drop-In on me list 1015. The system then stores that source chat participant's information in a database to identify the source chat participant as someone who has been pre-authorized to initiate a one-click chat session.

The "Drop in on them" list 1020 includes target chat participants who have authorized the source chat participant to drop in on the target chat participant. In this scenario, the chat participant associated with the user interface shown in FIG. 10, is the source chat participant and the "Drop in on them" 1020 provides the source chat participant with a list of target chat participants who have pre-authorized the source chat participant to drop in on the target chat participants. Therefore, if one of the chat participant's contacts has authorized the chat participant to drop-in on a target chat participant, then the target chat participant's name would appear in the "Drop in on them" list 1020.

While the "Drop in on me" list 1015 is modifiable by the target chat participant, the "Drop in on them" list 1020 is not modifiable by the target chat participant, because in those instances, the target chat participant needs to first be authorized to drop in on one of the target chat participant's contacts or followers.

FIG. 10 shows both the interface for the "Drop in on me" list 1015 and the interface for the "Drop in on them" list 1020. The target chat participant may use a mobile device to create a "Drop in on me" list 1015. The target chat participant may identify a source chat participant from the target chat participant's contacts and select to either add or remove that source chat participant from the "Drop in on me" list 1015. Once the target chat participant authorizes the list of source chat participants who may initiate a one-click chat session, the system may transmit that data to the cluster controller system to store it in a user data database, such as user data database 449.

FIG. 10 lists four source chat participants and identifies whether they have been permitted to drop in on the target chat participant, in this case, Person E's Drop-Ins 1000. The target chat participant has pre-authorized Person A 1030 and Person C 1050 to drop in on the target chat participant. This can be seen by the "−" icons 1035 and 1055, associated with Person A and Person C. Person B 1040 and Person D 1060 have not been pre-authorized to drop in on the target chat participant as can be seen by the "+" icons 1045 and 1065, but still appear in Person E's Drop-Ins 1000.

The icons 1035, 1045, 1055, and 1065 toggle between a "+" icon and a "−" icon to indicate whether the target chat participant has already authorized the source chat participant to drop-in or whether the target chat participant has not authorized the source chat participant. In this example, the "−" indicates that a source chat participant has already been pre-authorized, while a "+" indicates that a user has not been pre-authorized to initiate a one-click chat. While whether a source chat participant has been pre-authorized is shown with a "+" or "−" sign, this can be implemented with different icons for identifying whether a source chat participant has been pre-authorized to unilaterally initiate a chat.

The "Drop-in on them" list 1075 does not have the "+" and "−" icons because a source chat participant cannot unilaterally determine that the source chat participant is authorized to drop in on target chat participant. The target chat participant first needs to authorize the source chat participant in order for the source chat participant to be permitted to initiate a one-click video chat with the target chat participant. Therefore, the "Drop-in on them" list may only list the target chat participants who have already authorized the chat participant to drop-in on the target chat participants and is not generally editable by the source chat participant. Alternatively, the "Drop-in on them" screen might have an alternative scenario in which a chat participant grants chat preauthorization to a contact or follower, so that when the chat participant calls the contact or follower, the contact or follower sees the chat participant's audio and/or video components automatically.

The "Drop-in on them" list 1075 may indicate if the target chat participant has set a "Do-Not-Disturb" period. For example, if the target chat participant creates a setting that he does not wish to be disturbed for 10 minutes or during a certain time period 7:00 pm to 8:00 am, for example, the source chat participant may see that on his device.

The "Drop-in on them" list 1075 can be seen in the interface for Person A's Drop-Ins 1070. As seen in list 1075, the "Drop-in on them" button has been selected as shown by the bold text. Person E 1080 and Person F 1085 are shown as chat participants who have pre-authorized Person A to drop-in on them. The Drop-in on them list may include icons to initiate a one-click chat. Alternatively, the Drop-in on them list may not include any icons to permit the chat participant to initiate a one-click chat.

Figure 11:
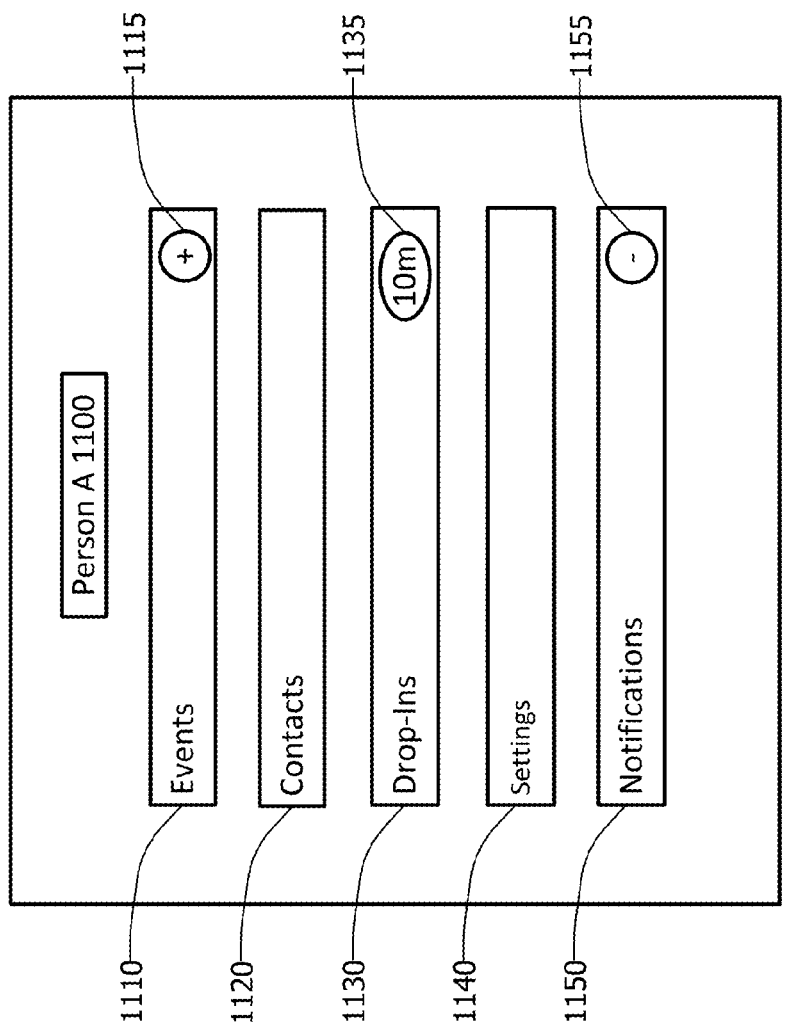
FIG. 11 is an interface for a target chat participant to modify settings related to the chat preauthorization.

FIG. 11 is an interface for a target chat participant to modify settings related to chat preauthorization. FIG. 11 generally shows an interface that allows a target chat participant to modify various settings including settings for the target chat participant's Drop-Ins lists. Specifically, FIG. 11 shows an interface to allow a target chat participant to add Events 1110. A target chat participant would add an event by selecting the "+" icon 1115. For example, a target chat participant could add the event information for an event the target chat participant plans to attend, such as a meeting with the target chat participant's boss. Similarly, a target chat participant could view the target chat participant's Contacts 1120.

A target chat participant may modify his Drop-Ins setting 1130. The interface shows that in this example, the target chat participant has modified his Drop-In setting to set his Do-Not-Disturb for a period of time, such as 10 minutes, shown in icon 1135.

When a user sets a Do-Not-Disturb, the system waits for that amount of time or until a predetermined time or until an event has occurred (such as a meeting or other chat has finished, the user is no longer has an "away" status, the user has closed an application) before transmitting the user's audio and/or video stream to the contact. For example, after the contact has selected to drop-in on the user, the system will check whether the user has set a Do-Not-Disturb status. If so, then the system will wait until the Do-Not-Disturb period is over. Once the Do-Not-Disturb period is over, the system will begin transmitting the audio and/or video component to the system. Alternatively, the system may tell the source chat participant that the target chat participant is busy. In this instance, the source chat participant would have to initiate a one-click chat session at a later time.

The Do-Not-Disturb period may be set on a schedule, for example, always turning on at a predetermined time in the evening until a predetermined time the next day. It may be set based upon current work schedules or applications that are open on the target chat participant's computing device. For example, while a Microsoft® Word® document tis open on the target chat participant's computing device (signifying that the target chat participant is working or doing homework), a Do-Not-Disturb period may be enforced.

A user may modify other Drop-In settings. For example, the user may prefer to set a Do-Not-Disturb for only certain contacts. In addition, the user may only permit an audio chat with a contact during a certain time. Therefore, the user may modify additional settings relating to the Drop-In feature.

In some instances, the chat participant's video stream will be transmitted after the Do-Not-Disturb period is over. In other instances, the chat participant's video stream will not be transmitted and the source chat participant will have to request a one-click chat session at a later time. The user can remove the Do-Not-Disturb status at anytime. Removing the Do-Not-Disturb setting will revert to the flow as described in FIG. 8, wherein a contact is allowed to drop-in on the user at anytime and wherein the user's video stream begins transmitting automatically after the contact selects to drop-in on the user.

In addition, a target chat participant may modify the target chat participant's Settings 1140. The target chat participant's settings might include his account information and other user specific data. In addition, the target chat participant could view his Notifications 1150 using the icon 1155. Notifications may include friends of the target chat participant that want to add the target chat participant to their contact lists.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or"

It is claimed:

1. A method for chat preauthorization, comprising:
receiving a chat request from a source chat participant requesting a chat session with a target chat participant while a computing device associated with the target chat participant is not generating any audio component nor any video component;
accessing a database to determine whether a target chat participant has pre-authorized a source chat participant to initiate a chat without requiring acceptance of a chat request; and
automatically causing the computing device associated with the target chat participant to begin providing at least one of an audio component and a video component to the source chat participant without any action on the part of the target chat participant;
dynamically allocating one of a plurality of servers in a server cluster for use in the chat, the chat including a video component from the target chat participant and a video component from the source chat participant; and
encoding the target chat participant's video component and the source chat participant's video component into a video stream, wherein the encoding is performed using at least one graphical processing unit, wherein the graphical processing unit is distinct from a central processing unit, and wherein the graphical processing unit is a special processor that includes an instruction set designed specifically for processing visual-related algorithms.

2. The method of claim 1, wherein the chat includes a video component from the source chat participant and wherein the source chat participant's video component is encoded into a video stream and combined into a master video stream.

3. The method of claim 2 wherein the Do-Not-Disturb period is based on a schedule pre-determined by the target chat participant.

4. The method of claim 2, wherein the chat includes an audio component from the source chat participant and wherein the source chat participant's audio component is encoded into an audio stream and transmitted to the target chat participant's device.

5. The method of claim 4, wherein the chat includes an audio component from the contact and wherein the contact's audio component is encoded into an audio stream and combined into a master audio stream along with the user's audio stream.

6. The method of claim 1, wherein the target chat participant has configured a Do-Not-Disturb period, and wherein the target chat participant's video stream is not transmitted to the source chat participant's device while the Do-Not-Disturb period is on.

7. The method of claim 1, wherein
a second source chat participant requesting to join the chat session with the target chat participant and the source chat participant
accessing a database to determine whether the target chat participant has pre-authorized the second source chat participant to initiate a chat without requiring acceptance of the chat request; and
automatically causing the computing device associated with the target chat participant to begin providing at least one of an audio component and a video component to the second source chat participant without any action on the part of the target chat participant.

8. A system for chat preauthorization comprising
a computing device associated with a target chat participant, wherein the computing device comprises a processor and memory for
receiving a chat request requesting a chat session with the target chat participant while the computing device associated with the target chat participant is not generating any audio component nor any video component
accessing a database to determine whether the target chat participant has pre-authorized the source chat participant to initiate a chat without requiring acceptance of the chat request;
automatically causing the computing device associated with the target chat participant to begin providing at least one of an audio component and a video component to the source chat participant without any action on the part of the target chat participant, and
a server cluster, including a plurality of servers, each of the plurality of servers incorporating a central processing unit and at least one graphical processing unit, wherein the graphical processing unit is distinct from the central processing unit, for
encoding the target chat participant's video component into a video stream, using the at least one graphical processing unit which is a special processor that includes an instruction set designed specifically for processing visual-related algorithms.

9. The system of claim 8, wherein the chat includes a video component from the source chat participant and wherein the source chat participant's video component is encoded into a video stream and combined into a master video stream.

10. The system of claim 8, wherein the target chat participant has configured a Do-Not-Disturb period, and wherein the target chat participant's video stream is not transmitted to the second device until the Do-Not-Disturb period is over.

11. The system of claim 10 wherein the Do-Not-Disturb period is based on a schedule predetermined by the target chat participant.

12. The system of claim 8, wherein the chat includes an audio component from the target chat participant and wherein the target chat participant's audio component is encoded into an audio stream and transmitted to the source chat participant's device.

13. The system of claim 12, wherein the chat includes an audio component from the source chat participant and wherein the source chat participant's audio component is encoded into an audio stream and combined into a master audio stream along with the target chat participant's audio stream.

14. A method for chat preauthorization, comprising:
receiving a chat request from a source chat participant requesting a chat session with a target chat participant while a computing device associated with the target chat participant is not generating any audio component nor any video component;
accessing a database to determine whether the source chat participant has pre-authorized the target chat participant to access at least one of an audio component or a video component of the source chat participant, when the source chat participant initiates a chat session request with the target chat participant;
automatically causing the computing device associated with the source chat participant to begin providing at least one of an audio component and a video component to the target chat participant without any action on the part of the target chat participant, dynamically allocating one of a plurality of servers in a server cluster for use in the chat, the chat including a video component from the source chat participant; and encoding the source chat participant's video component into a video stream, wherein the encoding is performed by using at least one graphical processing unit, wherein the graphical processing unit is distinct from a central processing unit, and wherein the graphical processing unit is a special processor that includes an instruction set designed specifically for processing visual-related algorithms.

* * * * *